US011221791B2

(12) United States Patent
Zhu et al.

(10) Patent No.: US 11,221,791 B2
(45) Date of Patent: Jan. 11, 2022

(54) MEMORY MANAGEMENT METHOD, MEMORY DEVICE, AND MEMORY CONTROL CIRCUIT FOR IMPROVING DATA CLASSIFICATION

(71) Applicant: Hefei Core Storage Electronic Limited, Anhui Province (CN)

(72) Inventors: Qi-Ao Zhu, Anhui Province (CN); Jing Zhang, Anhui Province (CN); Xin Wang, Anhui Province (CN); Kai-Di Zhu, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 0 days.

(21) Appl. No.: 16/547,598

(22) Filed: Aug. 22, 2019

(65) Prior Publication Data

US 2021/0004175 A1    Jan. 7, 2021

(30) Foreign Application Priority Data

Jul. 1, 2019  (CN) .......................... 201910585014.7

(51) Int. Cl.
  *G06F 3/06*    (2006.01)
(52) U.S. Cl.
  CPC .......... *G06F 3/0655* (2013.01); *G06F 3/0604* (2013.01); *G06F 3/0679* (2013.01)
(58) Field of Classification Search
  CPC ..... G06F 3/0655; G06F 3/0604; G06F 3/0679
  USPC ......................................................... 711/154
  See application file for complete search history.

(56) References Cited

U.S. PATENT DOCUMENTS

| 2014/0310494 | A1* | 10/2014 | Higgins | ............. | G06F 12/0246 |
| | | | | | 711/167 |
| 2015/0169442 | A1* | 6/2015 | Fisher | ................ | G06F 12/0253 |
| | | | | | 711/103 |
| 2017/0132125 | A1* | 5/2017 | Cai | ......................... | G06F 11/10 |
| 2017/0242592 | A1* | 8/2017 | Camp | .................. | G06F 3/0605 |
| 2018/0341415 | A1* | 11/2018 | Koudele | ............. | G11C 29/028 |
| 2020/0073591 | A1* | 3/2020 | Tsai | ...................... | G06F 3/0679 |

FOREIGN PATENT DOCUMENTS

| TW | I602190 | 10/2017 |
| TW | 201909183 | 3/2019 |

OTHER PUBLICATIONS

"Office Action of Taiwan Counterpart Application", dated Jun. 23, 2020, p. 1-p. 19.

\* cited by examiner

*Primary Examiner* — Than Nguyen
(74) *Attorney, Agent, or Firm* — JCIPRNET

(57) ABSTRACT

A memory management method, a memory storage device and a memory control circuit unit are disclosed. The method includes: receiving a first write command from a host system; instructing a rewritable non-volatile memory module to perform a first write operation according to the first write command; obtaining first performance information corresponding to the first write operation; and updating threshold information according to the first performance information, wherein the threshold information is configured to determine a type of target data.

18 Claims, 9 Drawing Sheets

THR=S, S=S+ΔS, i++
{if F(i)<0 , S=S+ΔS ;
if F(i)>0 , S=S−ΔS}    ~1001

MEMORY MANAGEMENT METHOD, MEMORY DEVICE, AND MEMORY CONTROL CIRCUIT FOR IMPROVING DATA CLASSIFICATION

CROSS-REFERENCE TO RELATED APPLICATION

This application claims the priority benefit of China application serial no. 201910585014.7, filed on Jul. 1, 2019. The entirety of the above-mentioned patent application is hereby incorporated by reference herein and made a part of this specification.

BACKGROUND

1. Technology Field

The present disclosure relates to a memory management technology, and in particular, to a memory management method, a memory storage device and a memory control circuit unit.

2. Description of Related Art

Digital cameras, mobile phones and MP3 players have been developed very rapidly in recent years, and the demands of customers for storage media also have increased rapidly. A rewritable non-volatile memory module (for example, a flash memory) is very suitable for being installed in the above exemplified various portable multimedia devices thanks to the characteristics of non-volatile data, power saving, small volume, no mechanical structure, and the like.

In a memory management technology, many operations are performed based on the characteristics and/or types of stored data. For example, in a data merging procedure (or a garbage collection procedure), valid data can be classified as cold data and hot data. The valid data belonging to cold data can be collected preferentially and stored centrally to improve the efficiency of the data merging process. Alternatively, data with different characteristics and/or of different types also can be managed by different data management mechanisms or data protection mechanisms to improve the data maintenance capacity for memory storage devices. Therefore, how to classify specific data effectively affects the system performance of the memory storage devices.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present disclosure provides a memory management method, a memory storage device and a memory control circuit unit which are capable of improving the data classification efficiency.

An exemplary embodiment of the present disclosure provides a memory management method, used for a rewritable non-volatile memory module. The memory management method includes: receiving a first write command from a host system; instructing the rewritable non-volatile memory module to perform a first write operation according to the first write command; obtaining first performance information corresponding to the first write operation; and updating threshold information according to the first performance information, where the threshold information is configured to determine a type of target data.

An exemplary embodiment of the present disclosure further provides a memory storage device which includes a connection interface unit, a rewritable non-volatile memory module and a memory control circuit unit. The connection interface unit is configured to be coupled to a host system. The memory control circuit unit is coupled to the connection interface unit and the rewritable non-volatile memory module. The memory control circuit unit is configured to receive a first write command from the host system. The memory control circuit unit is further configured to instruct the rewritable non-volatile memory module to perform a first write operation according to the first write command. The memory control circuit unit is further configured to obtain first performance information corresponding to the first write operation. The memory control circuit unit is further configured to update threshold information according to the first performance information, where the threshold information is configured to determine a type of target data.

An exemplary embodiment of the present disclosure further provides a memory control circuit unit which is configured to control a rewritable non-volatile memory module, and the memory control circuit unit includes a host interface, a memory interface and a memory management circuit. The host interface is configured to be coupled to a host system. The memory interface is configured to be coupled to the rewritable non-volatile memory module. The memory management circuit is coupled to the host interface and the memory interface. The memory management circuit is configured to receive a first write command from the host system. The memory management circuit is further configured to instruct the rewritable non-volatile memory module to perform a first write operation according to the first write command. The memory management circuit is further configured to obtain first performance information corresponding to the first write operation. The memory management circuit is further configured to update threshold information according to the first performance information, where the threshold information is used to determine type of target data.

Based on the above, after the first write command from the host system is received, the rewritable non-volatile memory module may perform the first write operation according to the first write command, and the first performance information corresponding to the first write operation may be obtained. Then, the threshold information may be updated and configured to determine the type of the target data according to the first performance information. Therefore, the data classification efficiency of the memory storage device can be effectively improved.

In order to make the aforementioned objectives and advantages of the present disclosure comprehensible, embodiments accompanied with figures are described in detail below.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

DESCRIPTION OF THE EMBODIMENTS

Figure 1:
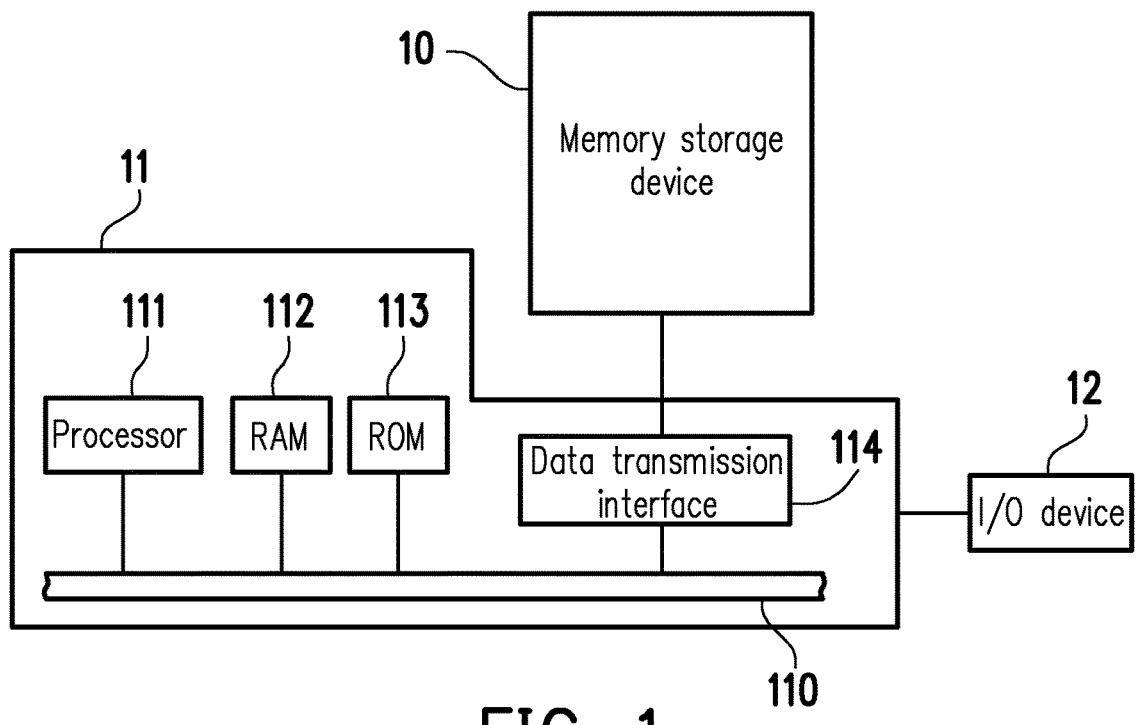
FIG. 1 is a schematic diagram of a host system, a memory storage device and an input/output (I/O) device illustrated according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also known as a memory storage system) includes a rewritable non-volatile memory module and a controller (also known as a control circuit). Generally, the memory storage device is used together with a host system to enable the host system to write data to or read data from the memory storage device.

Figure 2:
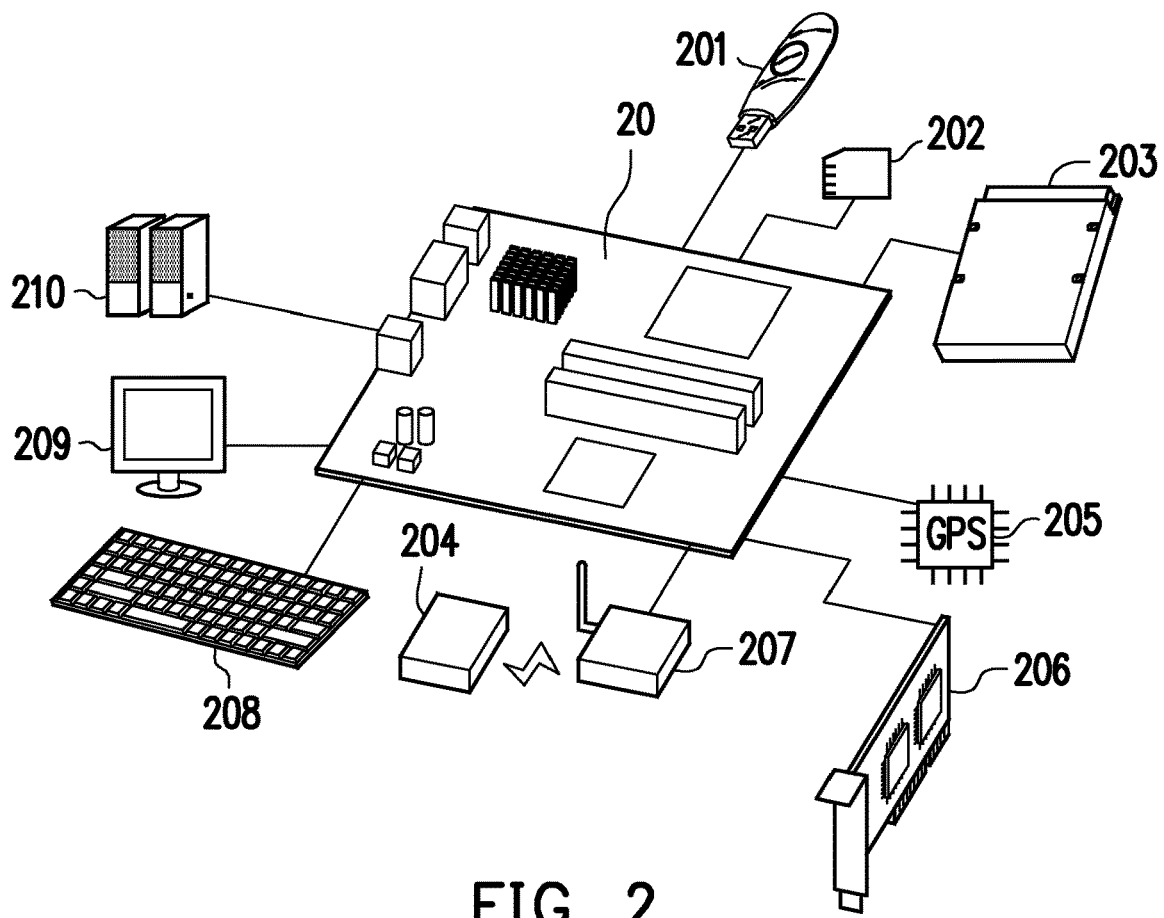
FIG. 2 is a schematic diagram of a host system, a memory storage device and an Input/Output (I/O) device illustrated according to an exemplary embodiment of the present disclosure.

FIG. 1 is a schematic diagram of a host system, a memory storage device and an input/output (I/O) device illustrated according to an exemplary embodiment of the present disclosure. FIG. 2 is a schematic diagram of a host system, a memory storage device and an I/O device illustrated according to an exemplary embodiment of the present disclosure.

Referring to FIGS. 1 and 2, the host system 11 generally includes a processor 111, a random access memory (RAM) 112, a read only memory (ROM) 113 and a data transmission interface 114. The processor 111, the RAM 112, the ROM 113 and the data transmission interface 114 are all coupled to a system bus 110.

In the present exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 is coupled to the I/O device 12 through the system bus 110. For example, the host system 11 may transmit an output signal to the I/O device 12 or receive an input signal from the I/O device 12 via the system bus 110.

In the present exemplary embodiment, the processor 111, the RAM 112, the ROM 113 and the data transmission interface 114 may be arranged on a motherboard 20 of the host system 11. There may be one or more data transmission interfaces 114. The motherboard 20 may be coupled to the memory storage device 10 via the data transmission interface 114 in a wired or wireless way. The memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a wireless fidelity (WiFi) memory storage device, a Bluetooth memory storage device or a Bluetooth low energy memory storage device (such as iBeacon). In addition, the motherboard 20 may also be coupled to various I/O devices such as a global positioning system (GPS) module 205, a network interface card 206, a wireless transmission device 207, a keyboard 208, a screen 209 and a speaker 210 through the system bus 110. For example, in an exemplary embodiment, the motherboard 20 may access the wireless memory storage device 204 via the wireless transmission device 207.

Figure 3:
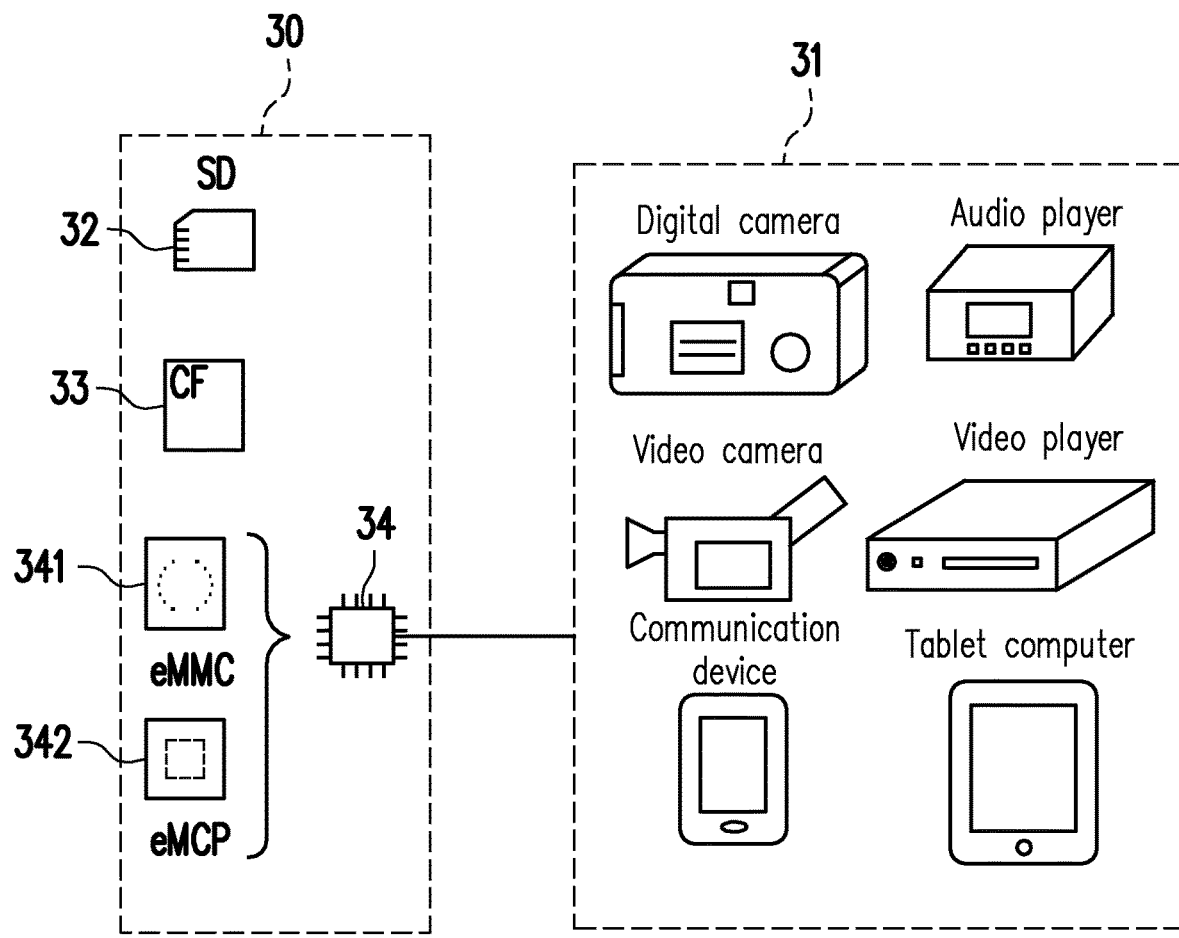
FIG. 3 is a schematic diagram of a host system and a memory storage device illustrated according to an exemplary embodiment of the present disclosure.

In an exemplary embodiment, the host system provided may be any system that may substantially cooperate with the memory storage device to store data. In the above exemplary embodiment, the host system is illustrated by a computer system, however, FIG. 3 is a schematic diagram of a host system and a memory storage device illustrated according to an exemplary embodiment of the present disclosure. Referring to FIG. 3, in another exemplary embodiment, the host system 31 may also be a digital camera, a video camera, a communication device, an audio player, a video player, or a tablet computer, or another system, and the memory storage device 30 may be various non-volatile memory storage devices such as a secure digital (SD) card 32, a compact flash (CF) card 33 or an embedded storage device 34 used by the host system. The embedded storage device 34 includes various types of embedded storage devices for directly coupling a memory module to a substrate of the host system, such as an embedded multi media card (eMMC) 341 and/or an embedded multi chip package (eMCP) storage device 342.

Figure 4:
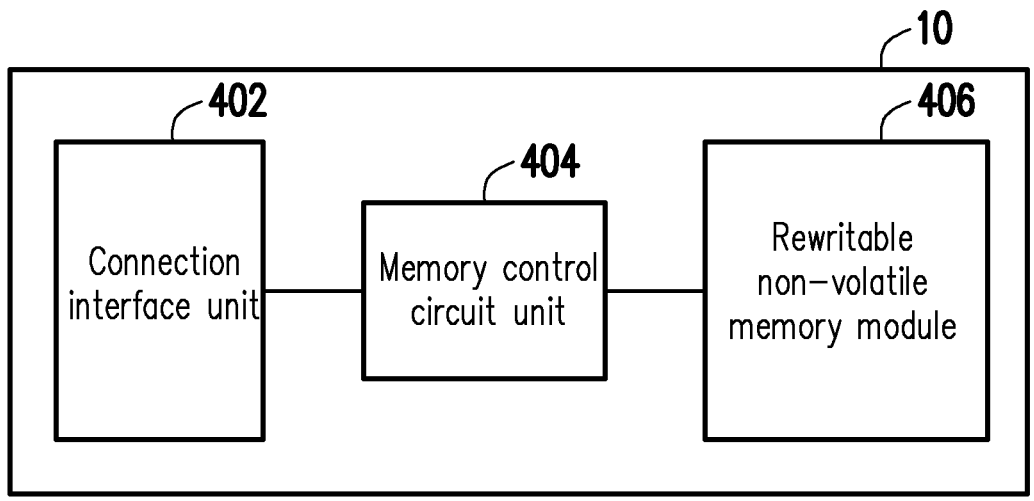
FIG. 4 is a general block diagram of a memory storage device illustrated according to an exemplary embodiment of the present disclosure.

FIG. 4 is a general block diagram of a memory storage device illustrated according to an exemplary embodiment of the present disclosure. Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. The memory storage device 10 may communicate with the host system 11 via the connection interface unit 402. In the present exemplary embodiment, the connection interface unit 402 is compatible with the serial advanced technology attachment (SATA) standard. However, it must be understood that the present disclosure is not limited thereto, and the connection interface unit 402 may also conform to the parallel advanced technology attachment (PATA) standard, the institute of electrical and electronic engineers (IEEE) 1394 standard, the high-speed peripheral component interconnect (PCI) express standard, the universal serial bus (USB) standard, the SD interface standard, the ultra high speed-I (UHS-I) interface standard, the ultra high speed II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard or other suitable standards. The connection interface unit 402 may be packaged in a chip with the memory control circuit unit 404, or the connection interface unit 402 may be arranged outside a chip including the memory control circuit unit 404.

The memory control circuit unit 404 is configured to execute a plurality of logic gates or control commands implemented in a hardware or firmware form, and perform write, read and erase operations and the like on data in the rewritable non-volatile memory module 406 according to a command of the host unit 11.

The rewritable non-volatile memory module 406 is coupled to the memory control circuit unit 404 and is configured to store data written by the host system 11. The rewritable non-volatile memory module 406 may be a single level cell (SLC) NAND-type flash memory module (i.e., a flash memory module with one memory cell that may store one bit), a multi level cell (MLC) NAND-type flash memory module (i.e., a flash memory module with one memory cell that may store 2 bits), a triple level cell (TLC) NAND-type flash memory module (i.e., a flash memory module with one memory cell that may store 3 bits), a quad level cell (QLC) NAND-type flash memory module (i.e., a flash memory module with one memory cell that may store 4 bits), other flash memory modules, or other memory modules with the same characteristic.

Each of the memory cells in the rewritable non-volatile memory module 406 stores one or more bits in response to a change in voltage (hereinafter also referred to as a threshold voltage). Specifically, there is a charge trapping layer between a control gate of each memory cell and a channel. By applying a write voltage to the control gate, the amount of electrons in the charge trapping layer may be changed, and then the threshold voltage of the memory cell is changed. This operation of changing the threshold voltage of the memory cell is also known as "writing data to the memory cell" or "programming the memory cell". As the threshold voltage changes, each of the memory cells of the rewritable non-volatile memory module 406 has a plurality of storage states. By applying a read voltage to determine a specific storage state of a specific memory cell, one or more bits stored by the memory cell may be obtained.

In the present exemplary embodiment, the memory cells of the rewritable non-volatile memory module 406 may constitute a plurality of physical programming units, and these physical programming units may constitute a plurality of physical erasing units. Specifically, the memory cells on the same word line may constitute one or more physical programming units. If each memory cell may store 2 or more bits, the physical programming units on the same word line would be at least classified into a lower physical programming unit and an upper physical programming unit. For example, a least significant bit (LSB) of one memory cell belongs to the lower physical programming unit, and a most significant bit (MSB) of one memory cell belongs to the upper physical programming unit. Generally speaking, in the MLC NAND-type flash memory, the write speed of the lower physical programming unit may be greater than that of the upper physical programming unit, and/or the reliability of the lower physical programming unit may be higher than that of the upper physical programming unit.

In the present exemplary embodiment, the physical programming unit is a programmed smallest unit. That is, the physical programming unit is the smallest unit for writing data. For example, the physical programming unit may be a physical page or a physical sector. If the physical programming units are the physical pages, the physical programming units may include a data bit region and a redundancy bit region. The data bit region contains a plurality of physical sectors configured to store user data, and the redundancy bit region is configured to store system data (such as an error correcting code and other management data). In the present exemplary embodiment, the data bit region contains 32 physical sectors, and one physical sector has a size of 512 bytes (B). However, in other exemplary embodiments, the data bit region may also contain 8, 16, or more or fewer physical sectors, and the size of each of the physical sectors may be larger or smaller. On the other hand, the physical erasing units are the smallest units for erasing. That is, each physical erasing unit contains the smallest number of memory cells to be erased together. For example, the physical erasing units may be physical blocks.

Figure 5:
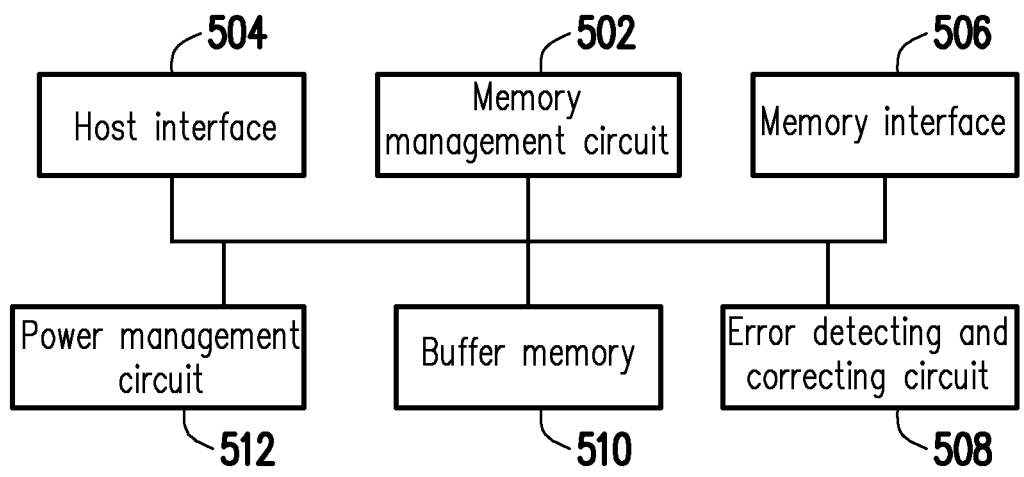
FIG. 5 is a general block diagram of a memory control circuit unit illustrated according to an exemplary embodiment of the present disclosure.

FIG. 5 is a general block diagram of a memory control circuit unit illustrated according to an exemplary embodiment of the present disclosure. Referring to FIG. 5, the memory control circuit unit 404 includes a memory management circuit 502, a host interface 504 and a memory interface 506.

The memory management circuit 502 is configured to control the overall operation of the memory control circuit unit 404. Specifically, the memory management circuit 502 has a plurality of control commands, and when the memory storage device 10 is in operation, these control commands are executed to perform operations such as writing, reading and erasing of the data. The following description of the operation of the memory management circuit 502 is equivalent to the description of the operation of the memory control circuit unit 404.

In the present exemplary embodiment, the control commands of the memory management circuit 502 are implemented in a firmware form. For example, the memory management circuit 502 has a microprocessor unit (not shown) and an ROM (not shown), and these control commands are recorded into the ROM. When the memory storage device 10 is in operation, these control commands would be executed by the microprocessor unit to perform the operations such as writing, reading and erasing of data.

In another exemplary embodiment, the control commands of the memory management circuit 502 may also be stored in a specific region (such as a system region specially configured to store system data in the memory module) of the rewritable non-volatile memory module 406 in a program code form. In addition, the memory management circuit 502 has a microprocessor unit (not shown), an ROM (not shown) and an RAM (not shown). Particularly, the ROM has a boot code, and when the memory control circuit unit 404 is enabled, the microprocessor unit would firstly execute the boot code to load the control commands stored in the rewritable non-volatile memory module 406 into the RAM of the memory management circuit 502. Then, the microprocessor unit may run these control commands to perform the operations such as writing, reading and erasing of the data.

In addition, in another exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit and a data processing circuit. The memory cell management circuit, the memory write circuit, the memory read circuit, the memory erase circuit and the data processing circuit are coupled to the microcontroller. The memory cell management circuit is configured to manage memory cells or memory cell groups of the rewritable non-volatile memory module 406. The memory write circuit is configured to send a write command sequence to the rewritable non-volatile memory module 406 to write data into the rewritable non-volatile memory module 406. The memory read circuit is configured to send a read command sequence to the rewritable non-volatile memory module 406 to read data from the rewritable non-volatile memory module 406. The memory erase circuit is configured to send an erase command sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write command sequence, the read command sequence and the erase command sequence may each include one or more program codes or command codes and are configured to instruct the rewritable non-volatile memory module 406 to perform the corresponding operations such as writing, reading and erasing. In an exemplary embodiment, the memory management circuit 502 may also send other types of command sequences to the rewritable non-volatile memory module 406 to instruct the latter to perform corresponding operations.

The host interface 504 is coupled to the memory management circuit 502. The memory management circuit 502 may communicate with the host system 11 through the host interface 504. The host interface 504 may be configured to receive and identify commands and data transmitted by the host system 11. For example, the commands and data transmitted by the host system 11 may be transmitted to the memory management circuit 502 through the host interface 504. In addition, the memory management circuit 502 may transmit data to the host system 11 via the host interface 504. In the present exemplary embodiment, the host interface 504 is compatible with the SATA standard. However, it must be understood that the present disclosure is not limited thereto, and the host interface 504 may be compatible with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard or other suitable data transmission standards.

The memory interface 506 is coupled to the memory management circuit 502 and is configured to access the rewritable non-volatile memory module 406. That is, data to be written to the rewritable non-volatile memory module 406 is converted into a format acceptable to the rewritable non-volatile memory module 406 via the memory interface 506. Specifically, if the memory management circuit 502 is to access the rewritable non-volatile memory module 406, the memory interface 506 would transmit corresponding command sequences. For example, these command sequences may include a write command sequence that instructs writing of data, a read command sequence that instructs reading of data, an erase command sequence that instructs erasing of data and corresponding command sequences that instruct various memory operations (such as changing of a read voltage level or performing of a garbage collection operation). These command sequences are generated, for example, by the memory management circuit 502 and transmitted to the rewritable non-volatile memory module 406 via the memory interface 506. These command sequences may include one or more signals, or data on a bus. These signals or data may include command codes or program codes. For example, the read command sequence would include information such as a read identification code and memory address.

In an exemplary embodiment, the memory control circuit unit 404 further includes an error detecting and correcting circuit 508, a buffer memory 510 and a power management circuit 512.

The error detecting and correcting circuit 508 is coupled to the memory management circuit 502 and is configured to perform an error detecting and correcting operation to ensure the correctness of data. Specifically, when the memory management circuit 502 receives a write command from the host system 11, the error detecting and correcting circuit 508 would generate a corresponding error correcting code (ECC) and/or an error detecting code (EDC) for data corresponding to the write command, and the memory management circuit 502 would write the data corresponding to the write command and the corresponding ECC and/or EDC to the rewritable non-volatile memory module 406. Then, when the memory management circuit 502 reads the data from the rewritable non-volatile memory module 406, the ECC and/or the EDC corresponding to the data may be read at the same time, and the error detecting and correcting circuit 508 would perform an error detecting and correcting operation on the read data according to the ECC and/or EDC.

The buffer memory 510 is coupled to the memory management circuit 502 and is configured to temporarily store the data and commands from the host system 11 or the data from the rewritable non-volatile memory module 406. The power management circuit 512 is coupled to the memory management circuit 502 and is configured to control a power supply of the memory storage device 10.

In an exemplary embodiment, the rewritable non-volatile memory module 406 of FIG. 4 is also known as a flash memory module, and the memory control circuit unit 404 is also known as a flash memory controller configured to control a flash memory module. In an exemplary embodiment, the memory management circuit 502 of FIG. 5 is also known as a flash memory management circuit.

Figure 6:
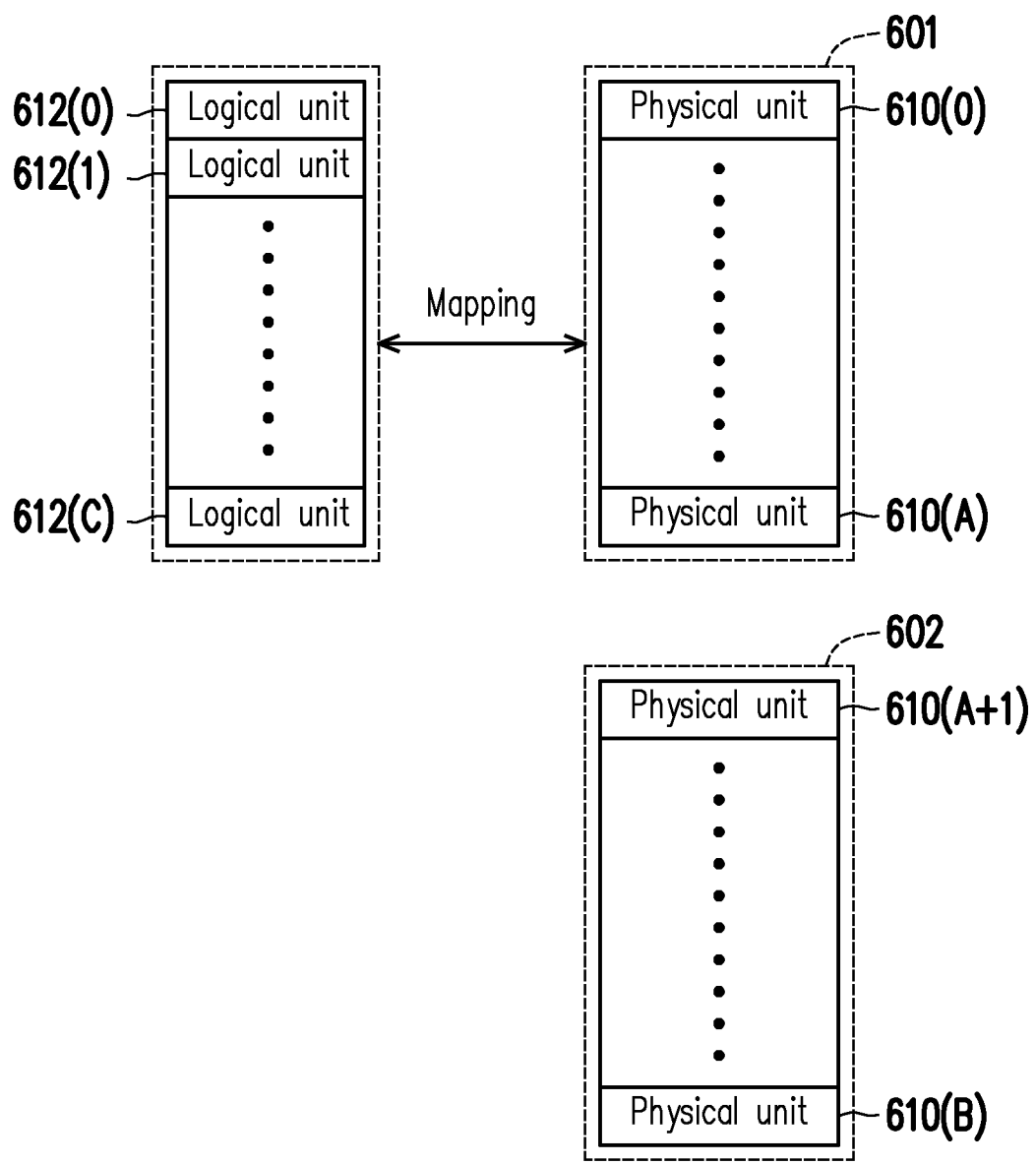
FIG. 6 is a schematic diagram of management of a rewritable non-volatile memory module illustrated according to an exemplary embodiment of the present disclosure.

FIG. 6 is a schematic diagram of management of a rewritable non-volatile memory module illustrated according to an exemplary embodiment of the present disclosure. Referring to FIG. 6, the memory management circuit 502 may logically group physical units 610(0) to 610(B) of the rewritable non-volatile memory module 406 into a storage region 601 and a replacement region 602. The physical units 610(0) to 610(A) in the storage region 601 are configured to store data, and the physical units 610(A+1) to 610(B) in the replacement region 602 are configured to replace damaged physical units in the storage region 601. For example, if data read from a certain physical unit contains too many errors and cannot be corrected, the physical unit would be considered as a damaged physical unit. It should be noted that if there are no available physical erasing units in the replacement region 602, the memory management circuit 502 may possibly declare the entire memory storage device 10 to be in a write protect state, and no data can be written again.

In the present exemplary embodiment, each physical unit refers to a physical erasing unit. However, in another exemplary embodiment, a physical unit may also refer to a physical address or a physical programming unit, or may consist of a plurality of continuous or non-continuous physical addresses. The memory management circuit 502 may assign logical units 612(0) to 612(C) to map the physical units 610(0) to 610(A) in the storage region 601. In the present exemplary embodiment, each logical unit refers to a logical address. However, in another exemplary embodiment, a logical unit may also refer to a logical programming unit or a logical erasing unit, or may consist of a plurality of continuous or non-continuous logical addresses. In addition, each of the logical units 612(0) to 612(C) may be mapped to one or more physical units.

The memory management circuit 502 may record a mapping relation (also known as a logical-to-physical address mapping relation) between the logical unit and the physical unit in at least one logical-to-physical address mapping table. When the host system 11 is to read data from the memory storage device 10 or write data to the memory storage device 10, the memory management circuit 502 may perform a data access operation on the memory storage device 10 according to the logical-to-physical address mapping table.

It is noted that in the following description, some terms may be replaced with corresponding abbreviations for ease of reading (see Table 1).

TABLE 1

| rewritable non-volatile memory module | RNVM module |
| memory management circuit | MMC |
| logical unit | LU |
| physical unit | PU |
| write command sequence | WCS |
| data update frequency | DUF |
| first type data | FTD |
| second type data | STD |
| write amplification | WAF |

Figure 7:
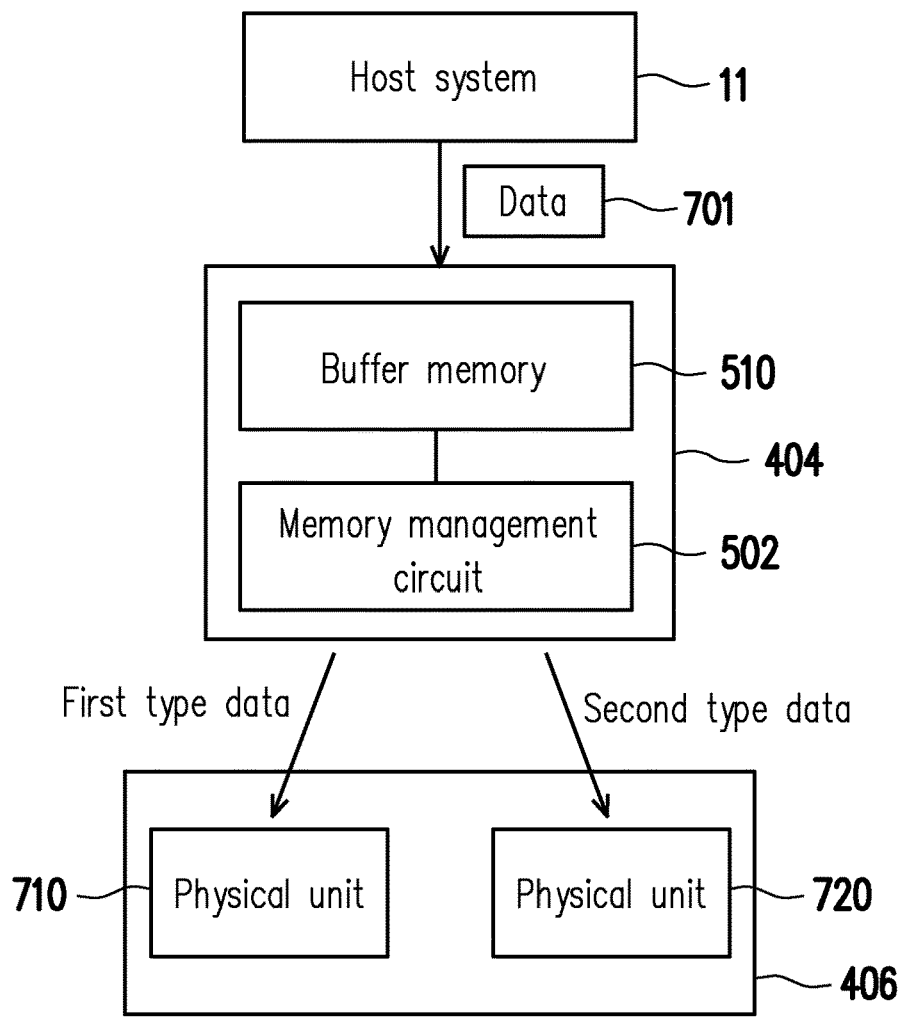
FIG. 7 is a schematic diagram of a data storage operation illustrated according to an exemplary embodiment of the present disclosure.

FIG. 7 is a schematic diagram of a data storage operation illustrated according to an exemplary embodiment of the present disclosure. Referring to FIG. 7, it is assumed that the MMC 502 receives at least one write command that indicates storage of data (also known as target data) 701 from the host system 11. The MMC 502 may temporarily store the write command and the data 701 in the buffer memory 510. The MMC 502 may read threshold information from the buffer memory 510. The MMC 502 may determine a type of the data 701 according to the threshold information.

In an exemplary embodiment, the MMC 502 may determine the data 701 as a FTD or a STD according to the threshold information. If the data 701 is the FTD, the MMC 502 may send at least one WCS (also known as a first WCS) to instruct the RNVM module 406 to store the data 701 in the buffer memory 510 to a PU (also known as a first PU) 710. Alternatively, if the data 701 is the STD, the MMC 502 may send at least one WCS (also known as a second WCS) to instruct the RNVM module 406 to store the data 701 to a PU (also known as a second PU) 720. It should be noted that the PUs 710 and 720 are two different PUs. For example, the storage region 601 of FIG. 6 may contain a plurality of spare PUs, and each of the spare PUs does not store valid data. For example, after a certain PU is erased, the erased PU may become a new spare PU. The PUs 710 and 720 may be selected from these spare PUs.

In an exemplary embodiment, different types of data have different data update frequencies. For example, the DUF of the FTD may be greater than that of the STD. Therefore, if the data 701 belong to the FTD, it is indicated that the DUF of the LU to which the data 701 belongs may be possibly higher (for example, greater than a threshold value). On the contrary, if the data 701 belong to the STD, it is indicated that the DUF of the LU to which the data 701 belongs may be possibly lower (for example, less than a threshold value). The MMC 502 may centrally store the FTD (namely the data with higher update frequency, also known as hot data) in the PU 710 and centrally store the STD (namely the data with lower update frequency, also known as cold data) in the PU 720.

In an exemplary embodiment, the MMC 502 may perform a data merging operation (such as a garbage collection operation) to release new spare PUs. The operation of releasing the new spare PUs involves collecting the valid data from a selected PU (also known as a source node) and erasing the PU. In the exemplary embodiment of FIG. 7, the FTD with the higher update frequency is centrally stored in the PU 710, so that the data in the PU 710 may be changed into invalid data very easily after multiple write operations, which then reduces the data volume of the valid data in the PU 710. Therefore, in the data merging operation performed subsequently, if the PU 710 is preferentially selected as the source node to collect the valid data therefrom, the spare PU release efficiency can be effectively improved.

In an exemplary embodiment, the MMC 502 may compare the data volume of the data 701 with the threshold information. If the data volume of the data 701 is less than the threshold information, the MMC 502 may determine the data 701 as the FTD. Alternatively, if the data volume of the data 701 is greater than (or not less than) the threshold information, the MMC 502 may determine the data 701 as the STD.

Figure 8:
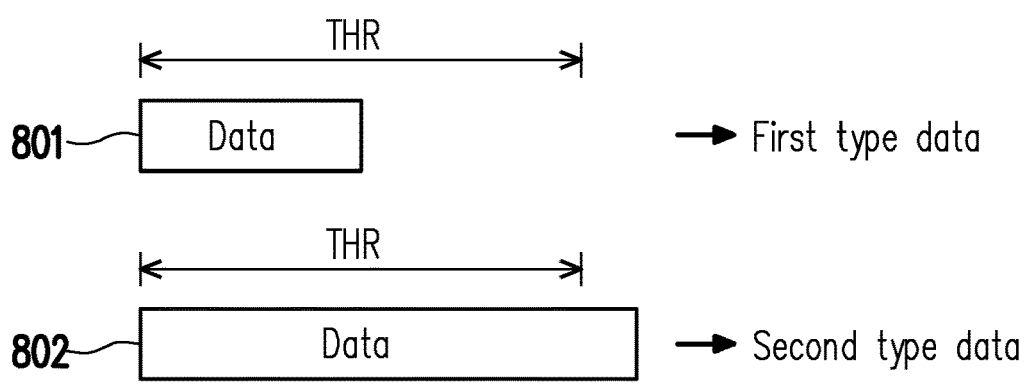
FIG. 8 is a schematic diagram of comparison of a data volume of target data with threshold information illustrated according to an exemplary embodiment of the present disclosure.

FIG. 8 is a schematic diagram of comparison of a data volume of target data with threshold information illustrated according to an exemplary embodiment of the present disclosure. Referring to FIG. 8, in an exemplary embodiment, if the data volume of data 801 is less than threshold information THR, the data 801 may be identified as the FTD. Alternatively, in an exemplary embodiment, if the data volume of data 802 is not less than the threshold information THR, the data 802 may be identified as the STD. The value of the threshold information THR may be, for example, 4 KB, 8 KB, 16 KB, or other values.

It should be noted that in another exemplary embodiment of FIG. 7, the MMC 502 may compare a logical range of the data 701 (i.e., a range of logical addresses of at least one LU to which the data 701 belongs) with the threshold information. If the logical range of the data 701 is less than the threshold information, the MMC 502 may determine that the data 701 belongs to the FTD (i.e., hot data). Alternatively, if the logical range of the data 701 is not less than the threshold information, the MMC 502 may determine that the data 701 belongs to the STD (i.e., cold data).

It should be noted that in an exemplary embodiment, the threshold information configured to determine a type of target data may be a fixed value. However, for memory storage devices of different models and/or with different operation behaviors, the accuracy of the same threshold information for identification of the type of the target data may be different. Therefore, if the value of the threshold information can be dynamically corrected and/or optimized during the operation of the memory storage device, customized threshold information may be provided for the memory storage devices of different models and/or with different operation behaviors, and then the efficiency of identifying the type of the target data may be improved. If the efficiency of identifying the type of the target data is improved, the efficiency of subsequent automatic management of the memory storage device may also be improved.

In an exemplary embodiment, the MMC 502 may receive at least one write command (also known as a first write command) from the host system 11. The first write command may instruct a storing of certain data (also known as first data) to at least one LU (also known as a first LU). According to the first write command, the MMC 502 may instruct the RNVM module 406 to perform a certain write operation (also known as a first write operation). In the first write operation, the RNVM module 406 may store the first data to one or more PUs mapped by the first LU. After the first write operation is performed, the MMC 502 may obtain performance information (also known as first performance information) corresponding to the first write operation. The first performance information may reflect the execution performance of the first write operation. Alternatively, the MMC 502 may evaluate the performance of the first write operation by using the first performance information. Then, the MMC 502 may update the threshold information according to the first performance information.

In an exemplary embodiment, the first performance information includes a WAF parameter (also known as a first WAF parameter). The first WAF parameter may reflect a WAF ratio caused by the first write operation. For example, it is assumed that the data volume of the first data is 16 KB, and the first write operation writes data of 48 KB in total during the first write operation. That is, in the first data write operation for storing the first data, the data volume of the written data is amplified by 3 times (48/16=3). For example, the data of 48 KB may contain at least one data moving and/or updating of management information. For example, the data moving may include moving the first data from a temporary storage region in the RNVM module 406 to a main storage region and/or moving part of the valid data in the RNVM module 406. The updating of the management information may include updating of the logical-to-physical address mapping relationship and the like. In addition, the value of the first WAF parameter may be negatively related to the execution performance of the first write operation. That is, if the value of the first WAF parameter is larger, it is indicated that the execution performance of the first write operation is lower.

In an exemplary embodiment, the MMC 502 may obtain a difference value between the first performance information and another performance information (also known as second performance information). The MMC 502 may update the threshold information according to the difference value. For example, the MMC 502 may determine whether the difference value meets a preset condition. If the difference value meets the preset condition, the MMC 502 may increase the value of the threshold information. Alternatively, if the difference value does not meet the preset condition, the MMC 502 may decrease the value of the threshold information.

In an exemplary embodiment, the MMC 502 may determine whether the difference value is less than zero. If the difference value is less than zero, the MMC 502 may determine that the difference value meets the preset condition and increase the value of the threshold information. Alternatively, if the difference value is not less than zero (e.g., greater than zero), the MMC 502 may determine that the difference value does not meet the preset condition and decrease the value of the threshold information.

In an exemplary embodiment, the MMC 502 may receive at least one write command (also known as a second write command) from the host system 11. The second write command may, for example, instruct storing of certain data (also known as second data) to at least one LU (also known as a second LU). According to the second write command, the MMC 502 may instruct the RNVM module 406 to perform a certain write operation (also known as a second write operation). In the second write operation, the RNVM module 406 may store the second data to one or more PUs mapped by the second LU. After the second write operation is performed, the MMC 502 may obtain performance information (i.e., the second performance information) corresponding to the second write operation. The second performance information may reflect the execution performance of the second write operation. Alternatively, the MMC 502 may evaluate the performance of the second write operation by using the second performance information. Then, the MMC 502 may update the threshold information according to the first performance information and the second performance information.

In an exemplary embodiment, the second performance information also includes a WAF parameter (also known as a second WAF parameter). The second WAF parameter may reflect a WAF ratio caused by the second write operation. For example, it is assumed that the data volume of the second data is 128 KB, and the first write operation writes data of 1024 KB in total during the second write operation. That is, in the second data write operation for storing the second data, the data volume of the written data is amplified by 8 times (1024/128=8). For example, the data of 1024 KB may also contain at least one data moving and/or updating of management information, and the descriptions thereof are omitted herein.

It should be noted that although the foregoing exemplary embodiments are merely examples taking the WAF parameters as the performance information, the present disclosure does not limit the type of the performance information that reflects the performance of the write operation. For example, in another exemplary embodiment, the performance information may also include other types of parameters to reflect a time length required by performing a certain write operation, and the like.

Figures 9, 10:
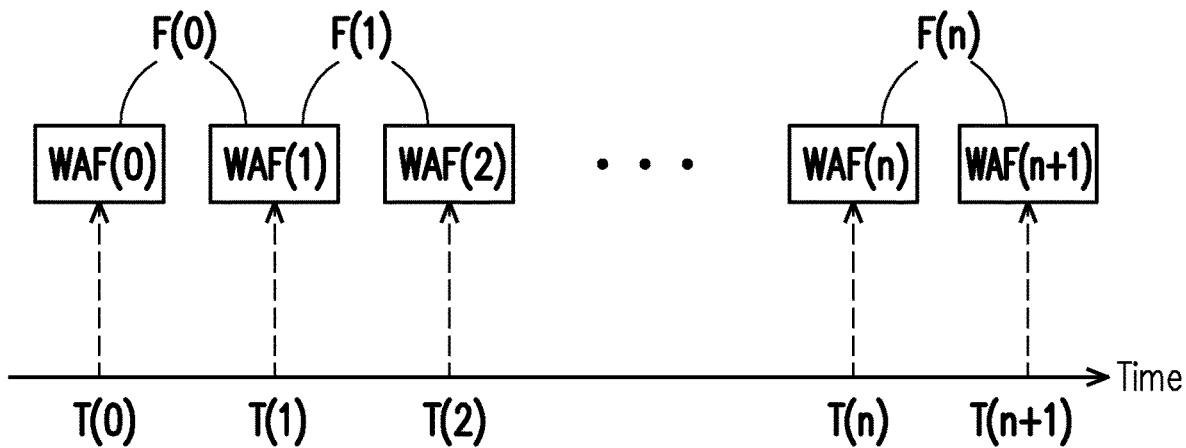
FIG. 9 is a schematic diagram of obtaining of performance information at different time points illustrated according to an exemplary embodiment of the present disclosure.
FIG. 10 is a schematic diagram of a pseudo code configured to update threshold information illustrated according to an exemplary embodiment of the present disclosure.

FIG. 9 is a schematic diagram of obtaining of performance information at different time points illustrated according to an exemplary embodiment of the present disclosure. FIG. 10 is a schematic diagram of a pseudo code configured to update threshold information illustrated according to an exemplary embodiment of the present disclosure.

Referring to FIGS. 9 and 10, it is assumed that an initial value of the threshold information THR is S. Performance information WAF(i) is obtained at a time point T(i), and i is between 0 and n+1. At a time point T(0), the threshold information THR is increased by an adjustment value ΔS. Between the time point T(0) and a time point T(1), performance information WAF(0) may be regarded as first performance information, and performance information WAF(1) may be regarded as second performance information. The performance information WAF(0) may reflect the performance of the first write operation before the time point T(0). The performance information WAF(1) may reflect the performance of the second write operation between the time points T(0) and T(1). A difference value F(0) between the performance information WAF(0) and WAF(1) may be obtained by subtracting the performance information WAF(1) from the performance information WAF(0). The threshold information THR may be updated according to the difference value F(0). For example, according to a pseudo code 1001, if the difference value F(0) is less than zero, the threshold information THR may be increased by the adjustment value ΔS. Alternatively, if the difference value F(0) is greater than zero, the threshold information THR may be decreased by the adjustment value ΔS.

Next, between the time point T(1) and the time point T(2), the performance information WAF(1) may be regarded as the first performance information, and the performance information WAF(2) may be regarded as the second performance information. The performance information WAF(1) may reflect the performance of the first write operation between the time points T(0) and T(1). The performance information WAF(2) may reflect the performance of the second write operation between the time points T(1) and T(2). A difference value F(1) between the performance information WAF(1) and WAF(2) may be obtained by subtracting the performance information WAF(2) from the performance information WAF(1). The threshold information THR may be updated again according to the difference value F(1). For example, according to the pseudo code 1001, if the difference value F(1) is less than zero, the threshold information THR may be increased by the adjustment value ΔS. Alternatively, if the difference value F(1) is greater than zero, the threshold information THR may be decreased by the adjustment value ΔS. By parity of reasoning, after a time point T(n+1), the threshold information THR may be updated by n times.

In an exemplary embodiment, if the performance information WAF(i) obtained at the time point T(i) approaches a fixed value, it means that current threshold information THR used to identify the type of the target data can enable the performance of the corresponding write operation to be stable. In this case, the current threshold information THR may be fixed and no longer updated. From another point of view, if the performance information WAF(i) obtained at the time point T(i) approaches a fixed value, it also means that the current threshold information THR has been updated to an optimal value. In this case, the overall property (including data write operation and/or data merging operation) of the memory storage device may be maintained in a good state. In addition, when the performance information WAF(i) is diverged again, the threshold information THR may be updated again.

Figure 11:
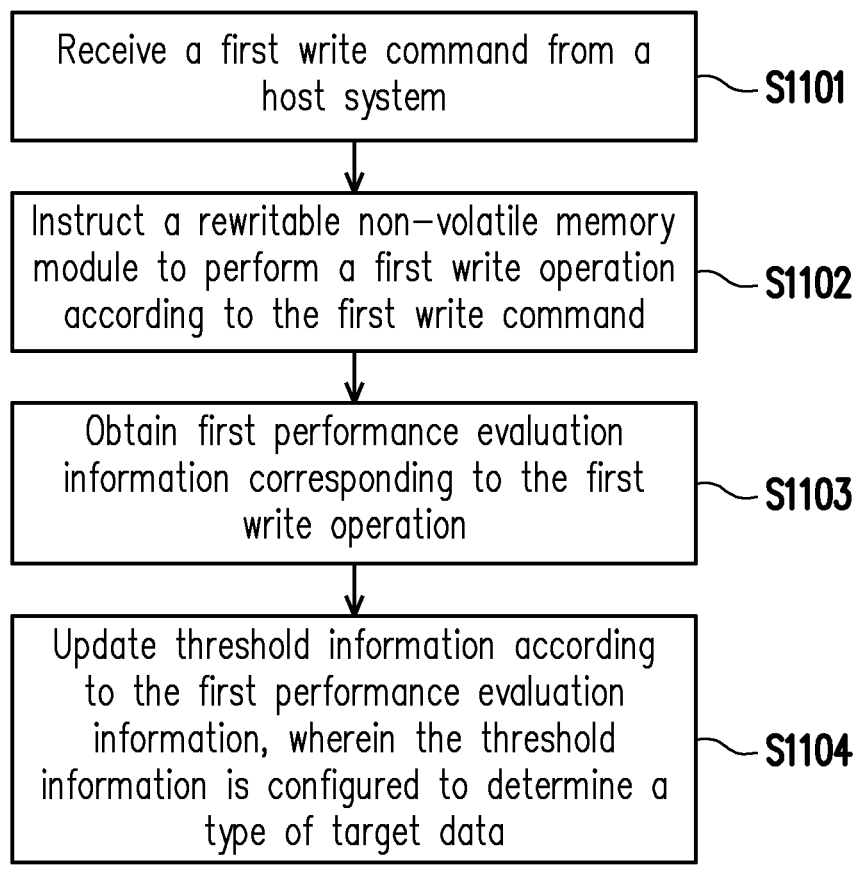
FIG. 11 is a flowchart of a memory management method illustrated according to an exemplary embodiment of the present disclosure.

FIG. 11 is a flowchart of a memory management method illustrated according to an exemplary embodiment of the present disclosure. Referring to FIG. 11, in step S1101, a first write command is received from a host system. In step S1102, a RNVM module is instructed to perform a first write operation according to the first write command. In step S1103, first performance information corresponding to the first write operation is obtained. In step S1104, threshold information is updated according to the first performance information, where the threshold information is configured to determine a type of target data.

Figure 12:
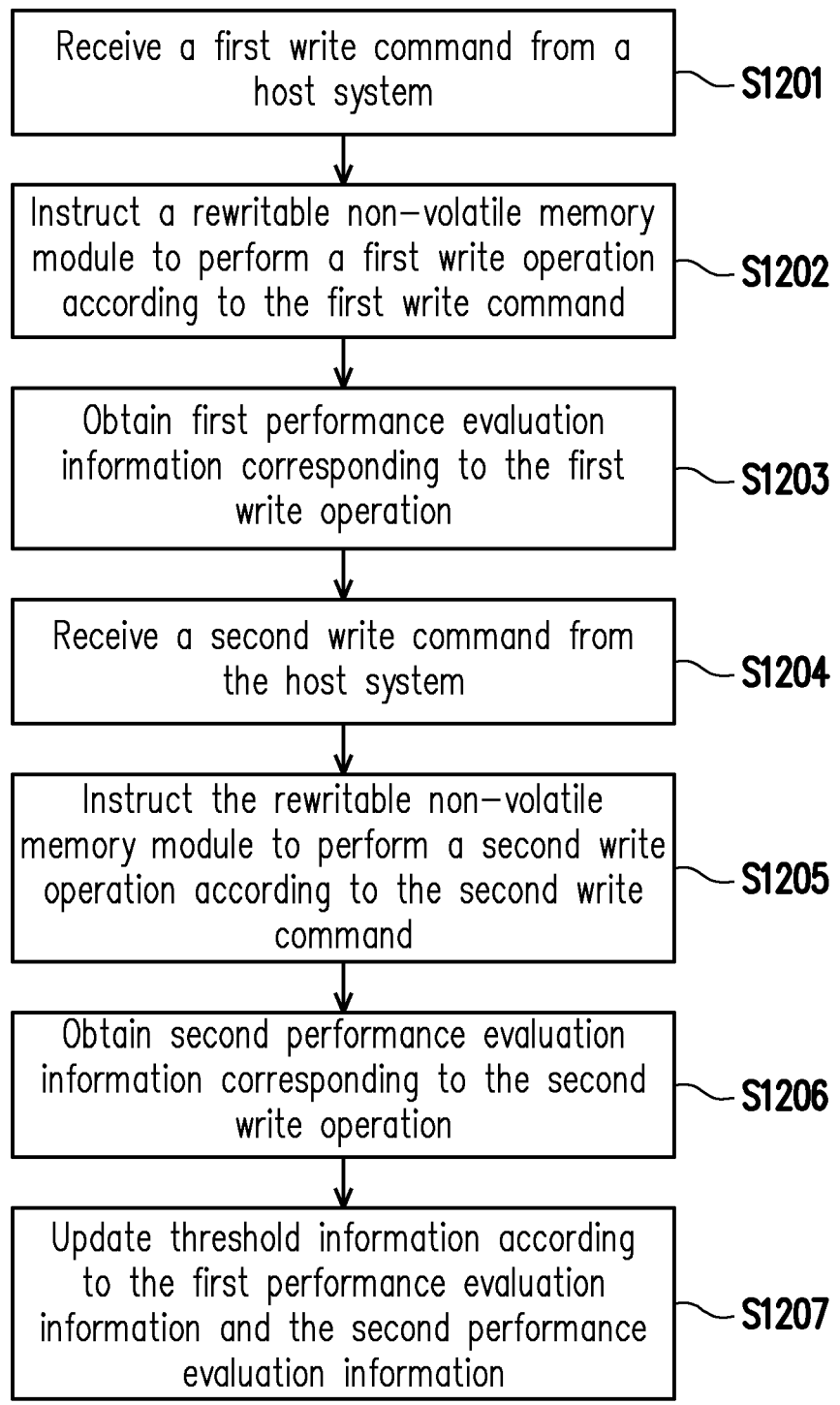
FIG. 12 is a flowchart of a memory management method illustrated according to an exemplary embodiment of the present disclosure.

FIG. 12 is a flowchart of a memory management method illustrated according to an exemplary embodiment of the present disclosure. Referring to FIG. 12, in step S1201, a first write command is received from a host system. In step S1202, a RNVM module is instructed to perform a first write operation according to the first write command. In step S1203, first performance information corresponding to the first write operation is obtained. In step S1204, a second write command is received from the host system. In step S1205, the RNVM module is instructed to perform a second write operation according to the second write command. In step S1206, second performance information corresponding to the second write operation is obtained. In step S1207, threshold information is updated according to the first performance information and the second performance information, where the threshold information is configured to determine a type of target data.

Figure 13:
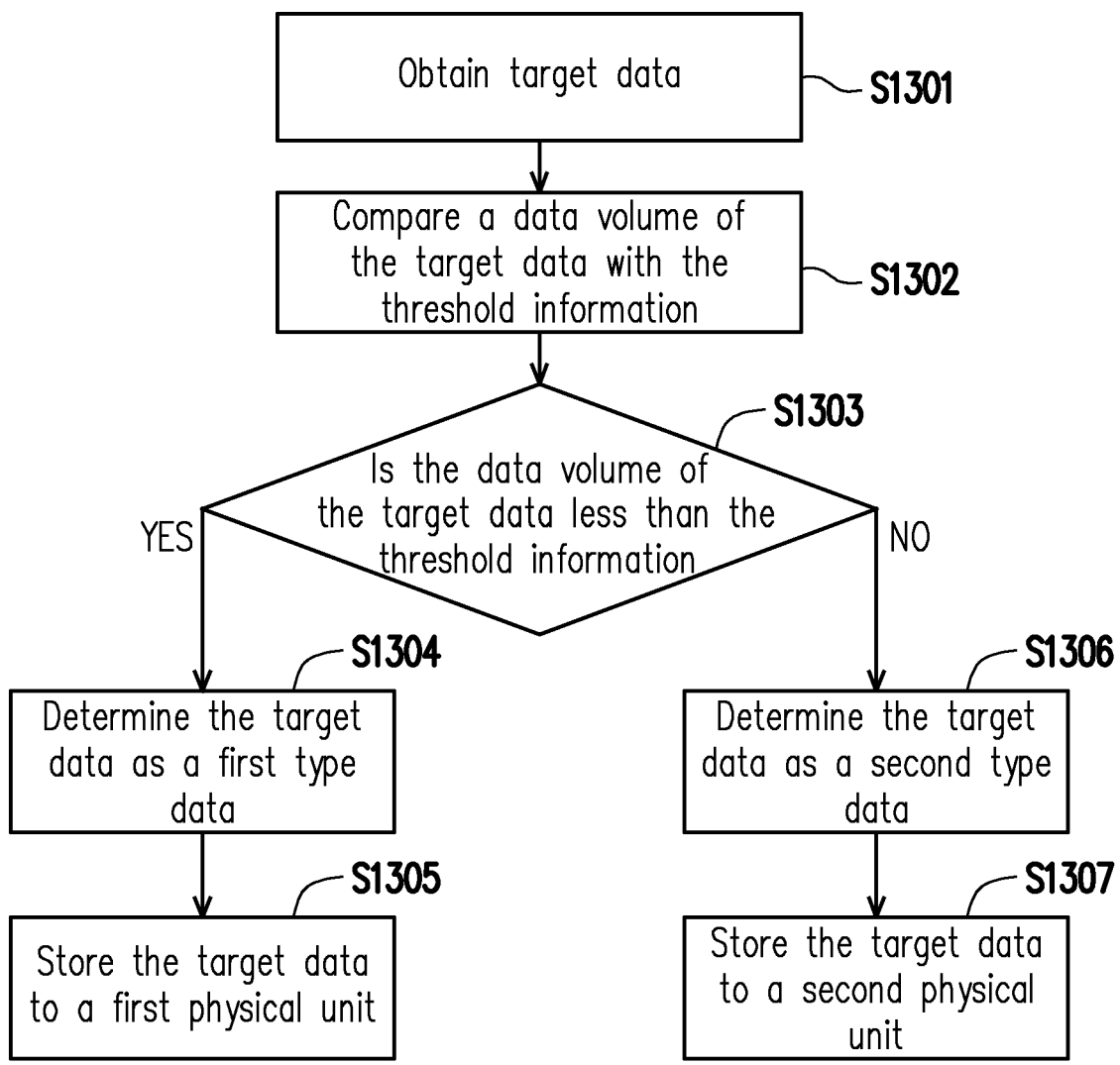
FIG. 13 is a flowchart of a memory management method illustrated according to an exemplary embodiment of the present disclosure.

FIG. 13 is a flowchart of a memory management method illustrated according to an exemplary embodiment of the present disclosure. Referring to FIG. 13, in step S1301, target data is obtained. In step S1302, the data volume of the target data is compared with threshold information. In step S1303, whether the data volume of the target data is less than the threshold information is determined. If the data volume of the target data is less than the threshold information, in step S1304, the target data is determined as a FTD, and in step S1305, the target data is stored to a first PU. However, if the data volume of the target data is not less than the threshold information, then in step S1306, the target data is determined as a STD, and in step S1307, the target data is stored to a second PU.

It should be noted that in the exemplary embodiment of FIG. 13, the step S1302 may also be modified as follows: a logical range of the target data is compared with the threshold information. If it is determined in step S1303 that the logical range of the target data is less than the threshold information, the step S1304 may be performed. In addition, if it is determined in step S1303 that the logical range of the target data is not less than the threshold information, the step S1306 may be performed.

However, the steps in FIGS. 11 to 13 have been described in detail as above, and the descriptions thereof are omitted herein. It is worth noting that the steps in FIGS. 11 to 13 may be implemented as a plurality of program codes or circuits, and are not limited by the present disclosure. In addition, the methods of FIGS. 11 to 13 may be used in combination with the above exemplary embodiments, or may be used alone, and are not limited by the present disclosure.

Based on the above, the performance information corresponding to a plurality of writing operations at different time points may be obtained. The threshold information may be updated and configured to determine the type of the target data according to the obtained performance information. Therefore, the data classification efficiency in the memory storage device can be effectively improved, and/or the overall performance of the memory storage device can be improved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method, used for a rewritable non-volatile memory module, the memory management method comprising:
   receiving a first write command from a host system;
   instructing the rewritable non-volatile memory module to perform a first write operation according to the first write command;
   obtaining a first write amplification parameter corresponding to the first write operation;
   receiving a second write command from the host system;
   instructing the rewritable non-volatile memory module to perform a second write operation according to the second write command;
   obtaining a second write amplification parameter corresponding to the second write operation;
   obtaining a difference value between the first write amplification parameter and the second write amplification parameter; and
   if the difference value meets a preset condition, increasing the value of the threshold, and
   if the difference value does not meet the preset condition, decreasing the value of the threshold, wherein the threshold is configured to determine a type of target data.

2. The memory management method according to claim 1, wherein the first write amplification parameter comprises a write amplification parameter, and the write amplification parameter reflects a write amplification ratio caused by the first write operation.

3. The memory management method according to claim 1, further comprising:
   determining the target data as a first type data or a second type data according to the threshold, wherein a data update frequency of the first type data is different from a data update frequency of the second type data.

4. The memory management method according to claim 3, wherein the step of determining the target data as the first type data or the second type data according to the threshold comprises:
   comparing a data volume of the target data with the threshold;
   if the data volume of the target data is less than the threshold, determining the target data as the first type data; and
   if the data volume of the target data is not less than the threshold, determining the target data as the second type data.

5. The memory management method according to claim 3, wherein the step of determining the target data as the first type data or the second type data according to the threshold comprises:
   comparing a logical range of the target data with the threshold;
   if the logical range of the target data is less than the threshold, determining the target data as the first type data; and
   if the logical range of the target data is not less than the threshold, determining the target data as the second type data.

6. The memory management method according to claim 1, wherein the rewritable non-volatile memory module comprises a plurality of physical units, the plurality of physical units comprise a first physical unit and a second physical unit, and the memory management method further comprises:
   if the target data is a first type data, sending a first write command sequence which instructs a writing of the target data to the first physical unit; and
   if the target data is a second type data, sending a second write command sequence which instructs a writing of the target data to the second physical unit,
   wherein the first physical unit is different from the second physical unit.

7. A memory storage device, comprising:
   a connection interface unit, configured to be coupled to a host system;
   a rewritable non-volatile memory module; and
   a memory control circuit unit, coupled to the connection interface unit and the rewritable non-volatile memory module,
   wherein the memory control circuit unit is configured to receive a first write command from the host system,
   the memory control circuit unit is further configured to instruct the rewritable non-volatile memory module to perform a first write operation according to the first write command,
   the memory control circuit unit is further configured to obtain a first write amplification parameter corresponding to the first write operation,
   the memory control circuit unit is further configured to receive a second write command from the host system,
   the memory control circuit unit is further configured to instruct the rewritable non-volatile memory module to perform a second write operation according to the second write command,
   the memory control circuit unit is further configured to obtain a second write amplification parameter corresponding to the second write operation,
   the memory control circuit unit is further configured to obtain a difference value between the first write amplification parameter and the second write amplification parameter,
   if the difference value meets a preset condition, the memory control circuit unit is further configured to increase the value of the threshold, and
   if the difference value does not meet the preset condition, the memory control circuit unit is further configured to decrease the value of the threshold, wherein the threshold is configured to determine a type of target data.

8. The memory storage device according to claim 7, wherein the first write amplification parameter comprises a write amplification parameter, and the write amplification parameter reflects a write amplification ratio caused by the first write operation.

9. The memory storage device according to claim 7, wherein the memory control circuit unit s further configured to determine the target data as a first type data or a second type data according to the threshold, wherein a data update frequency of the first type data is different from a data update frequency of the second type data.

10. The memory storage device according to claim 9, wherein the operation of determining the target data as the first type data or the second type data according to the threshold by the memory control circuit unit comprises:
comparing a data volume of the target data with the threshold;
if the data volume of the target data is less than the threshold, determining the target data as the first type data; and
if the data volume of the target data is not less than the threshold, determining the target data as the second type data.

11. The memory storage device according to claim 9, wherein the operation of determining the target data as the first type data or the second type data according to the threshold by the memory control circuit unit comprises:
comparing a logical range of the target data with the threshold;
if the logical range of the target data is less than the threshold, determining the target data as the first type data; and
if the logical range of the target data is not less than the threshold, determining the target data as the second type data.

12. The memory storage device according to claim 7, wherein the rewritable non-volatile memory module comprises a plurality of physical units; the plurality of physical units comprise a first physical unit and a second physical unit,
if the target data is a first type data, the memory control circuit unit is further configured to send a first write command sequence which instructs a writing of the target data to the first physical unit, and
if the target data is a second type data, the memory control circuit unit is further configured to send a second write command sequence which instructs a writing of the target data to the second physical unit,
wherein the first physical unit is different from the second physical unit.

13. A memory control circuit unit, configured to control a rewritable non-volatile memory module, the memory control circuit unit comprising:
a host interface, configured to be coupled to a host system;
a memory interface, configured to be coupled to the rewritable non-volatile memory module; and
a memory management circuit, coupled to the host interface and the memory interface,
wherein the memory management circuit is configured to receive a first write command from the host system,
the memory management circuit is further configured to instruct the rewritable non-volatile memory module to perform a first write operation according to the first write command,
the memory management circuit is further configured to obtain a first write amplification parameter corresponding to the first write operation,
the memory management circuit is further configured to receive a second write command from the host system,
the memory management circuit is further configured to instruct the rewritable non-volatile memory module to perform a second write operation according to the second write command,
the memory management circuit is further configured to obtain a second write amplification parameter corresponding to the second write operation,
the memory management circuit is further configured to obtain a difference value between the first write amplification parameter and the second write amplification parameter,
if the difference value meets a preset condition, the memory management circuit is further configured to increase the value of the threshold, and
if the difference value does not meet the preset condition, the memory management circuit is further configured to decrease the value of the threshold, wherein the threshold is configured to determine a type of target data.

14. The memory control circuit unit according to claim 13, wherein the first write amplification parameter comprises a write amplification parameter, and the write amplification parameter reflects a write amplification ratio caused by the first write operation.

15. The memory control circuit unit according to claim 13, wherein the memory management circuit is further configured to determine the target data as a first type data or a second type data according to the threshold, wherein a data update frequency of the first type data is different from a data update frequency of the second type data.

16. The memory control circuit unit according to claim 15, wherein the operation of determining the target data as the first type data or the second type data according to the threshold by the memory management circuit comprises:
comparing a data volume of the target data with the threshold;
if the data volume of the target data is less than the threshold, determining the target data as the first type data; and
if the data volume of the target data is not less than the threshold, determining the target data as the second type data.

17. The memory control circuit unit according to claim 15, wherein the operation of determining the target data as the first type data or the second type data according to the threshold by the memory management circuit comprises:
comparing a logical range of the target data with the threshold;
if the logical range of the target data is less than the threshold, determining the target data as the first type data; and
if the logical range of the target data is not less than the threshold, determining the target data as the second type data.

18. The memory control circuit unit according to claim 13, wherein the rewritable non-volatile memory module comprises a plurality of physical units; the plurality of physical units comprise a first physical unit and a second physical unit,
if the target data is a first type data, the memory management circuit is further configured to send a first write command sequence which instructs a writing of the target data to the first physical unit, and
if the target data is a second type data, the memory management circuit is further configured to send a second write command sequence which instructs a writing of the target data to the second physical unit, wherein the first physical unit is different from the second physical unit.

\* \* \* \* \*